(12) United States Patent
Holmstrom et al.

(10) Patent No.: US 7,529,443 B2
(45) Date of Patent: May 5, 2009

(54) BEAM STEERING ELEMENT WITH BUILT-IN DETECTOR AND SYSTEM FOR USE THEREOF

(75) Inventors: Roger P. Holmstrom, St. Charles, IL (US); Miriam Qunell, Naperville, IL (US); David W. Jenkins, North Aurora, IL (US)

(73) Assignee: Tellabs Operations, Inc., Naperville, IL (US)

( * ) Notice: Subject to any disclaimer, the term of this patent is extended or adjusted under 35 U.S.C. 154(b) by 4 days.

(21) Appl. No.: 11/796,550

(22) Filed: Apr. 27, 2007

(65) Prior Publication Data

US 2007/0292077 A1 Dec. 20, 2007

Related U.S. Application Data

(63) Continuation-in-part of application No. 11/263,529, filed on Oct. 31, 2005, now abandoned.

(51) Int. Cl.
*G02B 6/26* (2006.01)
(52) U.S. Cl. .......................................... 385/18; 385/16
(58) Field of Classification Search .............. 385/16–20
See application file for complete search history.

(56) References Cited

U.S. PATENT DOCUMENTS

| 6,044,705 | A | * | 4/2000 | Neukermans et al. .... 73/504.02 |
| 6,483,962 | B1 | | 11/2002 | Novotny |
| 6,643,425 | B1 | * | 11/2003 | Bowers et al. ................ 385/18 |
| 6,647,168 | B2 | | 11/2003 | Hsu et al. |
| 6,760,506 | B2 | | 7/2004 | Laor |
| 6,847,752 | B2 | | 1/2005 | Nemirovsky |
| 6,990,264 | B2 | | 1/2006 | Telkamp et al. |
| 7,027,682 | B2 | | 4/2006 | Ruan et al. |
| 7,058,253 | B1 | * | 6/2006 | Novotny ....................... 385/18 |
| 2005/0220394 | A1 | | 10/2005 | Yamamoto et al. |

* cited by examiner

*Primary Examiner*—Charlie Peng
(74) *Attorney, Agent, or Firm*—Hamilton, Brook, Smith & Reynolds, P.C.

(57) ABSTRACT

An all-optical cross-connect switching system provides optical switching that may reduce processing requirements by three orders of magnitude over conventional techniques by associating at least one optical detector with an optical beam steering element. In one embodiment, a first beam steering element, having a reflective surface in optical association with a first optical fiber array, and a second beam steering element, having a reflective surface in optical association with a second optical fiber array, are optically arranged to direct an optical beam from a first optical fiber in the first optical fiber array to a second optical fiber in the second optical fiber array. The optical detector provides information about a first position of the optical beam on the second beam steering element. Based on this information, the angle of the first beam steering element may be adjusted to cause the optical beam to change to a second position on the second beam steering element.

24 Claims, 15 Drawing Sheets

BEAM STEERING ELEMENT WITH BUILT-IN DETECTOR AND SYSTEM FOR USE THEREOF

RELATED APPLICATIONS

This application is a continuation-in-part of U.S. application Ser. No. 11/263,529, filed on Oct. 31, 2005, now abandoned the entire contents of which are incorporated by reference.

BACKGROUND OF THE INVENTION

Increasingly large volumes of information are transferred across telecommunications networks to meet the increasing Internet and business communications demands. High speed communications systems in the telecommunications networks often employ fiber optic communications channels with electronic switches and routers to transfer the increasingly large volumes of information. However, a combination of optical data transmission and electronic switching requires numerous optical-to-electrical-to-optical conversions. These conversions create significant overhead in terms of power consumption, bandwidth limitations, size of system components, overall system throughput, and latency. As such, much research has been performed to develop all-optical cross-connect switching systems.

In an all-optical cross-connect switching system, optical beams from transmitting apertures are connected to corresponding receiving apertures in the switching system by pointing direction, reflection, refraction, diffraction, or combinations thereof. To set-up optical connections, conventional optical cross-connect systems generally utilize secondary optical beams emitted by an array of light emitting diodes (LEDs) associated with input ports that are used to locate the proper corresponding output or connecting ports, or vice-versa. As part of the set-up process, the connecting ports may employ a detector coupled to a fiber receiving the secondary optical beam to detect the secondary optical beam. However, such a setup requires sophisticated processing, very accurate positioning of the detector components, and sophisticated components. In addition, if the transmission length of the optical beam is long relative to the size of the receiving aperture, the algorithm needed to center the optical beam on the receiving aperture becomes even more complex and/or requires highly sophisticated processing and, thus, more processing time. In an optical cross-connect system, these requirements result in undesirable delay in setting-up connections, higher per-port costs, and lower reliability.

SUMMARY OF THE INVENTION

An all-optical cross-connect switching system provides optical switching with significantly reduced processing requirements and cost and with increased reliability by associating an optical detector with an optical beam steering element. In one embodiment, the all-optical cross-connect switching system includes (i) a first beam steering element having a reflective surface in optical association with a first optical fiber array and (ii) a second beam steering element having a reflective surface in optical association with a second optical fiber array. In this embodiment, the first and second beam steering elements are optically arranged to direct an optical beam from a first optical fiber in the first optical fiber array to a second optical fiber in the second optical fiber array. Further, in this embodiment, the second beam steering element includes at least one optical detector that provides information about a first position of the optical beam on the second beam steering element, which may be an indication of an angle of the first beam steering element. Based on this information, the angle of the first beam steering element may be adjusted to cause the optical beam to change to a second position on the second beam steering element.

Other embodiments of the present invention include the optical beam steering element with built-in detector and a method of manufacturing same.

BRIEF DESCRIPTION OF THE DRAWINGS

The foregoing and other objects, features and advantages of the invention will be apparent from the following more particular description of example embodiments of the invention, as illustrated in the accompanying drawings in which like reference characters refer to the same parts throughout the different views. The drawings are not necessarily to scale, emphasis instead being placed upon illustrating the principles of the invention.

FIG. 7A-1 is a top view of a portion of an optical beam steering element having four detector elements and showing a misaligned optical beam;

FIG. 7A-2 is a graph indicating the misalignment of the optical beam of FIG. 7A-1;

FIG. 7B-1 is a top view of a portion of the optical beam steering element of FIG. 7A-1 showing an aligned optical beam; and FIG. 7B-2 is a graph indicating the alignment of the optical beam of FIG. 7B-1.

DETAILED DESCRIPTION OF THE INVENTION

A description of example embodiments of the invention follows.

Figure 1:
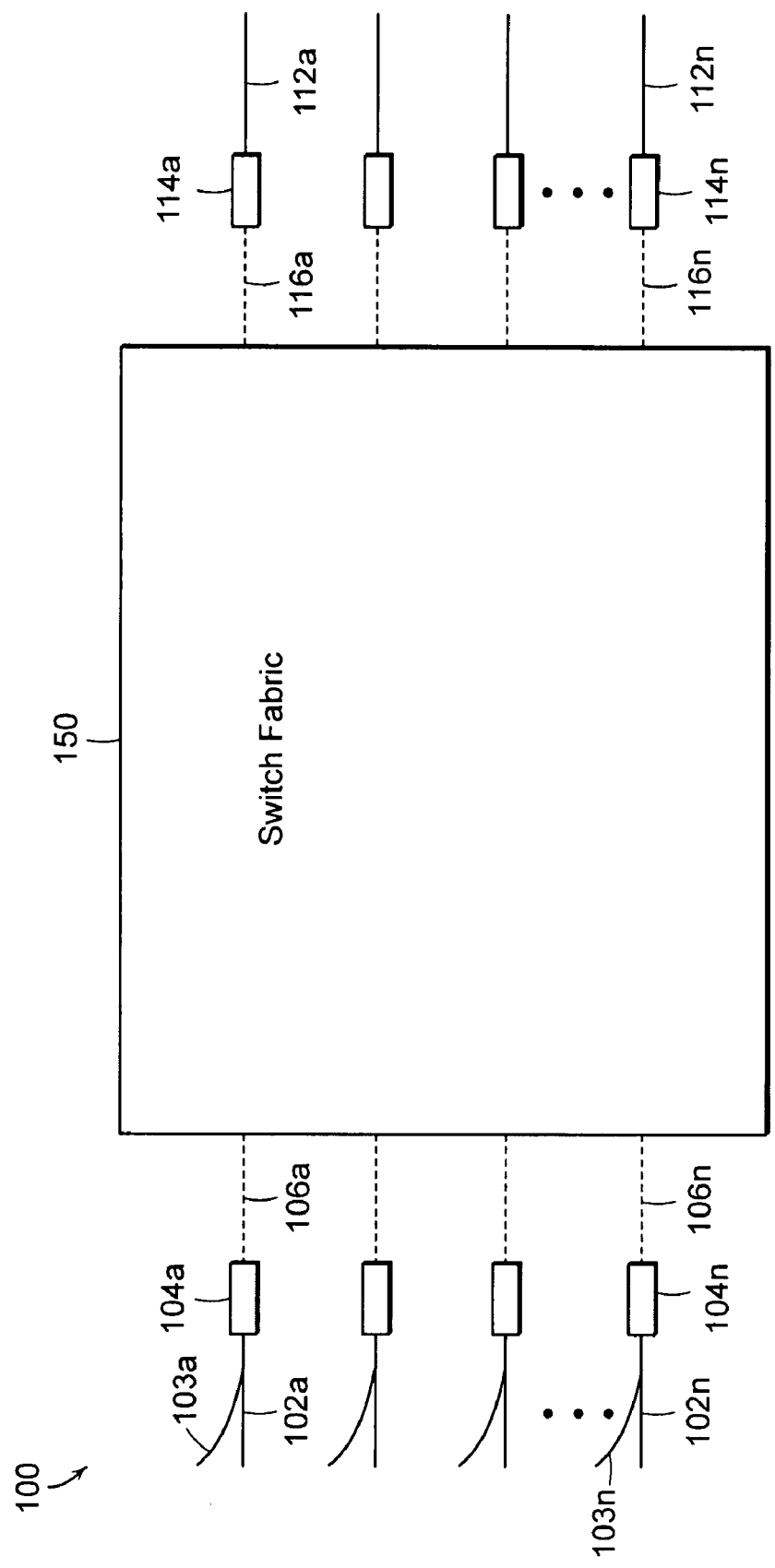
FIG. 1 is a block diagram of an optical cross-connect switching system that may employ an embodiment of the present invention.

FIG. 1 is a block diagram of an optical cross-connect switching system 100 that may employ embodiments of the present invention. The optical cross-connect switching system 100 includes an optical cross-connect switch 150 (also referred to as a switch fabric) interfacing with an array of input fibers 102a, ..., 102n and an array of output fibers 112a, ..., 112n. In the example embodiment, each of the input fibers 102a, ..., 102n has a respective coupler 103a, ..., 103n that allows additional light sources (not shown) to be added to the input fibers 102a, ..., 102n. The additional light sources may include light sources used for angle detection and control of beam steering elements (not shown), as described in reference to FIGS. 2A and 2B. Continuing to refer to FIG. 1, the array of input fibers 102a, ..., 102n interfaces with the optical cross-connect switch 150 through a corresponding array of input apertures (e.g., lenses) 104a, ..., 104n and input free space interconnects 106a, ..., 106n. The array of output fibers 112a, ..., 112n interfaces with the optical cross-connect switch 150 through a corresponding array of output apertures 114a, ..., 114n and output free space interconnects 116a, ..., 116n.

The optical cross-connect switch 150 reroutes optical signals from the array of input fibers 102a, ..., 102n to the array of output fibers 112a, ..., 112n. Optical cross-connects (OXCs), such as the optical cross-connect switch 150, perform switching operations in networks, such as ring and mesh networks, to transfer information between or among communicating nodes in the network, such as end user nodes, central offices, content servers, end user nodes, and so forth. Optical cross-connects enable network service providers to switch high-speed optical signals efficiently.

Conventional optical cross-connects perform switching electrically. However, as understood in the art, the combination of optical data transmission and electronic switching requires numerous optical-to-electrical-to-optical conversions. Electronic switches typically convert the optical signals received on the input fiber channels 102a, ..., 102n into electrical signals, electrically route these signals, convert the electrical signals back into optical signals, and launch them into the output fiber channels 112a, ..., 112n. These conversions create significant overhead in terms of power consumption, bandwidth limitations, size of system components, overall system throughput, and latency.

Electronic switches are often blocking (i.e., disallowing signal fan-out and fan-in) and are non-transparent (i.e., the signal does not stay in optical form, and the signal may depend upon bit rate, format, and coding). Also, in the electronic switching case, the bandwidth of the optical signal must be within the bandwidth of the electronic switch, which can be orders of magnitude less than the bandwidth of the optical signal. Thus, the electronic switch becomes the network system's bottleneck. As such, much research has been performed to develop all-optical cross-connect switching systems using various mechanisms, such as movable mirrors, movable fibers, acousto-optic diffraction, electro-optic refraction, magneto-optic switching, movable bubbles, and liquid crystal addressable arrays.

Figure 2A:
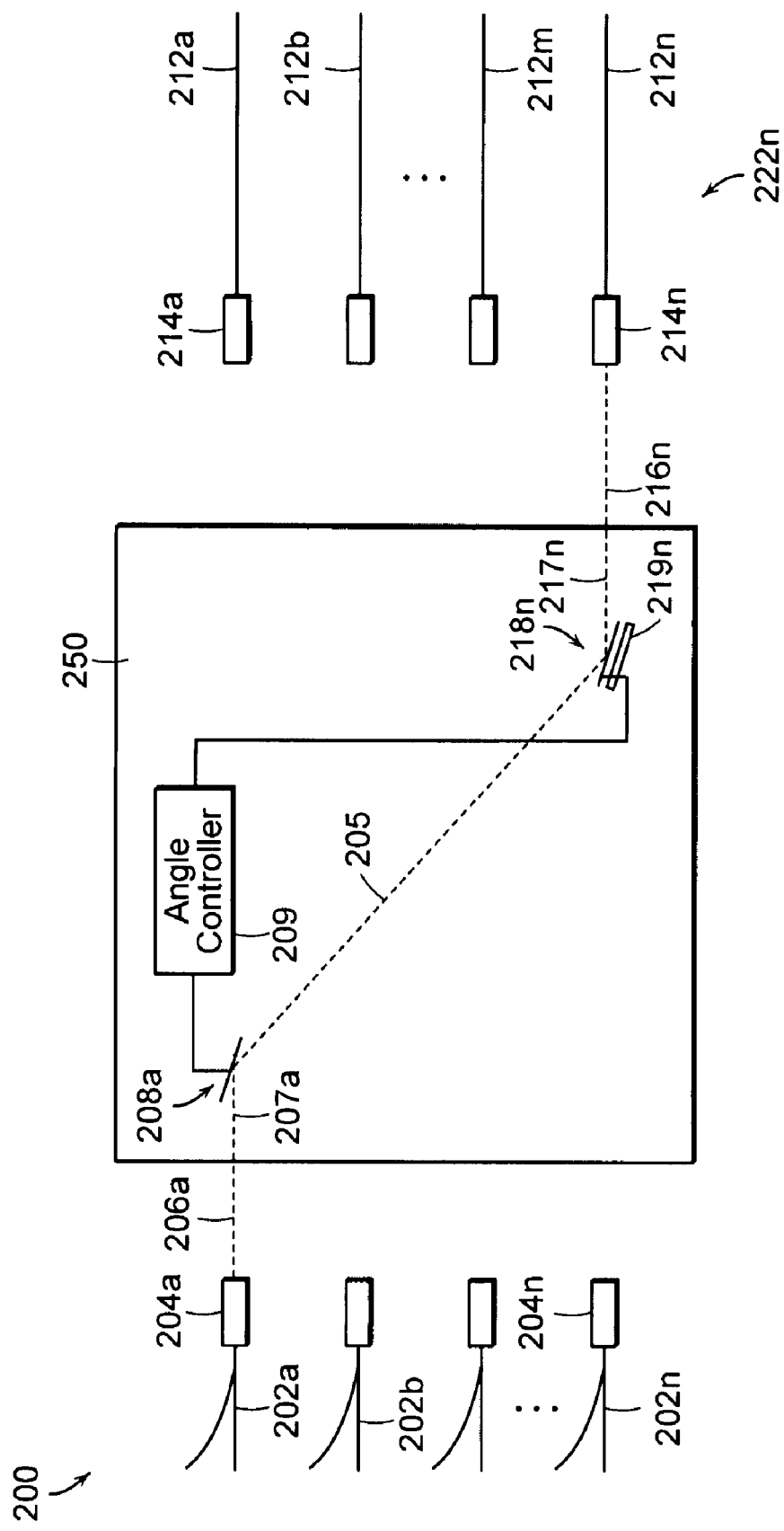
FIG. 2A is a block diagram of an all-optical cross-connect switching system incorporating an output beam steering element with built-in detector according to an embodiment of the present invention.

FIG. 2A is a block diagram of an all-optical cross-connect switching system 200, according to an embodiment of the present invention, that provides increased cost-effectiveness, increased reliability, and decreased delay. An optical switch 250 according to an embodiment of the present invention includes (i) an input beam steering element 208a that has a reflective surface, such as a mirror or multi-layer dielectric, corresponding to an input fiber 202a and (ii) an output beam steering element 218n with an optical detector corresponding to an output fiber 212n. The other input fibers 202b, ..., 202n and other output fibers 212a, ..., 212m also have corresponding input and output beam steering elements, respectively (not shown).

The optical switch 260 according to an embodiment of the present invention further includes a power detector 219n, such as defined by one or more optical detector elements (details not shown), associated with the output beam steering element 218n. The term "associated with" is defined herein to encompass any physical arrangement the optical detector element(s) can have with the reflective surface, such as covered by, interspacially covered by, covered by a portion of, adjacent to, on top of, inset in, and so forth. The power detector 219n detects a position of the optical beam 205 on the surface of the beam steering element 218n. The detected position is transmitted to an angle controller 209, which provides actuation signals to the input beam steering element 208a to adjust the position of the optical beam 205 on the surface of the output beam steering element 218n.

Couplers 203a-n may be employed to couple light sources (not shown) with alignment wavelength(s) λa other than traffic wavelength λt (e.g., 1310 nm, 1490 nm, 1550 nm) to be presented to the input beam steering element 208a and detected by the power detector 219n. In one embodiment, the power detector 219n receives both the alignment wavelength(s) λa and traffic wavelengths λt but responds (i.e., provides a signal 231) only or substantially as a function of the alignment wavelength(s) λa. In other embodiments, the traffic and alignment wavelengths can be positionally offset or semi-overlapping. In whichever embodiment, an optical wavelength can be used that directly measures an angle between the input and output beam steering elements 208a, 218n. Details are presented in reference to FIGS. 6A through 6C and 7A and 7B.

Figure 2B:
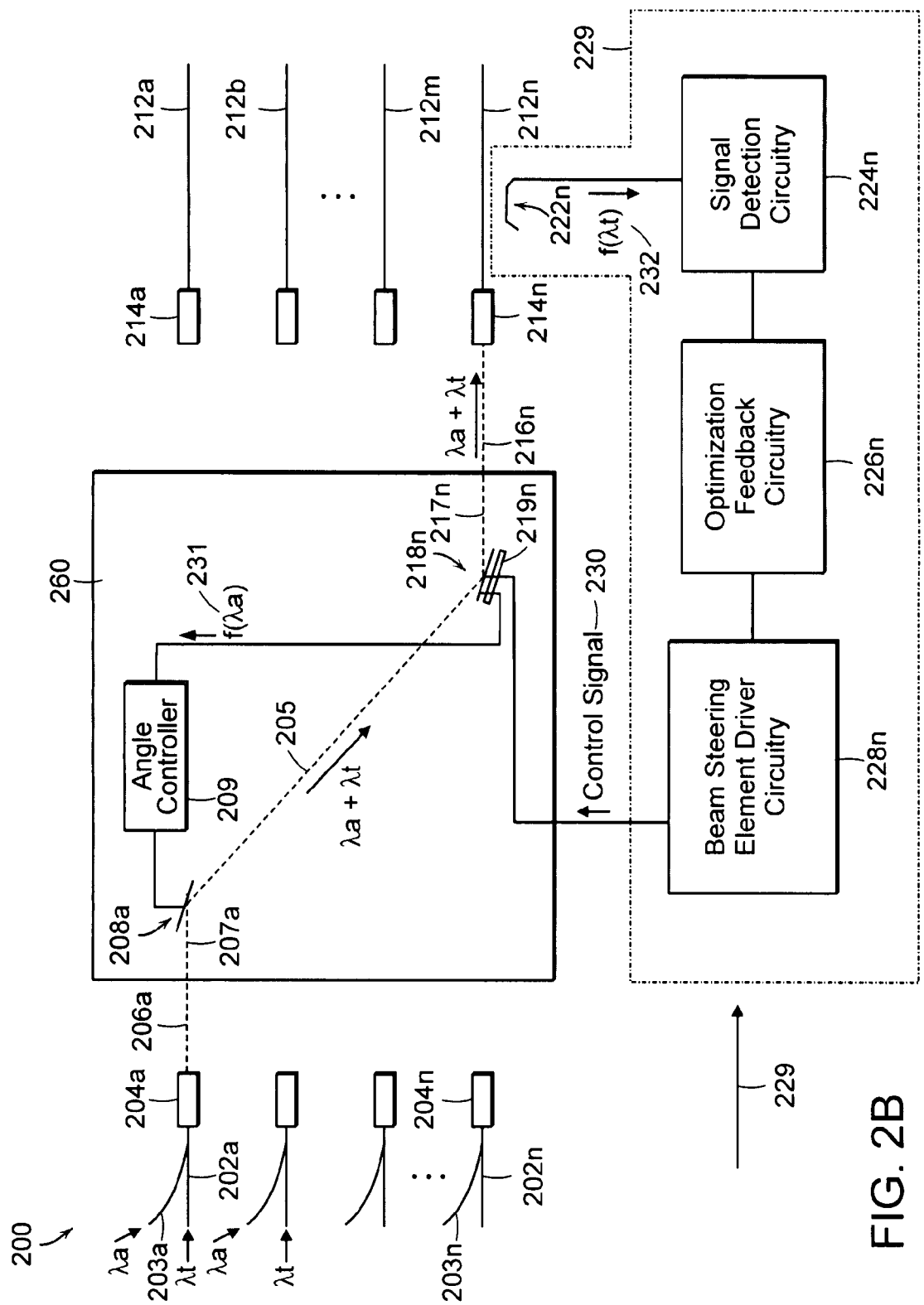
FIG. 2B is a block diagram of an all-optical cross-connect switching system incorporating the output beam steering element with built-in detector and a feedback circuit for the input beam steering element according to an embodiment of the present invention and also including an exemplary feedback control circuit for the output beam steering element.

FIG. 2B is a block diagram of an all-optical cross-connect switching system 260 that includes the power detector 219n and angle controller 209 and further incorporates feedback control system 229 to control the output beam steering element 218n to direct the optical beam 205 onto the center of the corresponding output aperture 214n. The feedback control system 229 depicted in FIG. 2B incorporates an optical power detector 222n coupled to a corresponding output fiber 212n. The optical power detector 222n transmits detected power as a signal 232 that is substantially a function of traffic wavelength(s) λt to signal detection circuitry 224n. The signal detection circuitry 224n transmits information about the power level to optimization feedback circuitry 226n, which calculates a direction in which to orient the output beam steering element 218n to optimize the optical power on the output fiber 212n. The optimization feedback circuitry 226n transmits the calculated direction to beam steering element driver circuitry 228n, which converts the calculated direction into a control signal 230. The control signal 230 is sent to the output beam steering element 218n, causing the output beam steering element 218n to move and redirect the optical beam 205 toward the center of the output aperture 214n. It should be understood that a separate control system 229 may be provided to control each of the output beam steering elements 218a-n (others not shown for clarity).

The all-optical cross-connect switching system 200, shown in FIGS. 2A and 2B, employs free space interconnects (e.g., 206a and 216n) and uses two two-degree of freedom (e.g., tip and tilt axes) beam steering elements because of spatial and angular requirements for coupling an optical beam 205 into output apertures 214a, ..., 214n. Thus, in some embodiments, the all-optical cross-connect switching system 200 is a "free-space" system, as opposed to a guided beam, solid state system (i.e., an optical cross-connect switching system employing an electronic switch). In other embodiments, the system 200 may include guided beam, solid state elements. Other beam steering configurations are also possible, such as four one-degree of freedom beam steering elements. The all-optical cross-connect switching system's 200 inputs and outputs may be arranged in a two-dimensional array (not shown) in order to achieve economy of space. Thus, to direct the optical beam 205 from a particular input fiber (e.g., 202a) to a particular output fiber (e.g., 212n), the optical beam 205 may be moved in two dimensions. To do so, for example, the input beam steering element 208a may provide beam steering in two perpendicular directions. Similarly, and depending on the exact nature of the beam steering mechanism, the output beam steering element 218a may also provide two-dimensional beam steering capability. For example, if the apertures are fixed and the switch mechanism provides steering of the beam (as depicted in FIGS. 2A and 2B), the output beam steering element 218n may be used to ensure that an output beam 217n is positioned optimally in the output aperture 214n.

In the embodiment shown in FIG. 2B, the input beam steering element 208a points an input beam 207a to the desired row and column position on the output beam steering element 218n. The input beam steering element 208a may position the input beam 207a in the center of the output beam steering element 218n. The output beam steering element 218n may then realign the optical beam 205 to the output aperture 214n. The output beam steering element 218n may direct the optical beam 205 to the center of the output aperture 214n. Each input fiber 202a, ..., 202n and output fiber 214a, ..., 214n may use dedicated beam steering elements with two-dimensional beam steering capability. Other embodiments may use four, single-axis, tiltable, beam steering elements instead of two, double-axis, tiltable, beam steering elements. It should be understood that any geometric or coordinate system designs may be employed in other embodiments, optionally in combination with the ones specifically set forth herein.

When a connection is first established, the input and output beam steering elements 208a, 218n (or at least two input and at least two output beam steering elements) may be tilted to prescribed tilt angles. These angles and the corresponding deflection drive signals (e.g., voltages for electrostatically deflected beam steering elements) may be determined for each connection (e.g., input fiber 202a and each of output fibers 214a, ..., 214n) and may be stored in system memory and recalled when the connection is first established. The stored drive signals, however, may result in tilt angles that are in the vicinity of the desired tilt angles, but are offset by some value due to drift, aging, environmental effects, etc. Thus, the system 200 may optimize the coupling efficiency (i.e., ratio of output power to input power) with a scanning/search and an optimization method.

An example optimization method may scan the input and output beam steering elements 208a, 218n incrementally until an optimum or acceptable coupling efficiency is achieved. The size of the tilt increments (degrees) of the scan and, thus, the tilt angle drive signal increments (e.g., voltage), may be small enough so that several increments result in an acceptable coupling efficiency, i.e., several scan positions of the input and output beam steering elements 208a, 218n may result in an acceptable coupling efficiency. In this case, the system is said to be less sensitive to tilt angle error. If there are fewer tilt angle increments that result in acceptable coupling efficiency, then the system is said to be more sensitive to tilt angle error. The range of the scan may be determined by a maximum error in the angular position. The number of scan increments is the range divided by the increment size. Thus, each scanning axis has a scanning capability of n positions, where n is equal to or greater than the scan range divided by the increment size. The input beam steering element 208a may be scanned through its $n^2$ positions for each position of the output beam steering element 218n. In such a case, there are $n^4$ positions for the entire scanning range (all four tilt axes=n×n×n×n). Clever optimization algorithms have been developed (e.g., the hill-climbing algorithm or the rosette pattern) to ease scanning time required to achieve acceptable coupling efficiency. Nevertheless, the amount of continual processing that may be required to establish and maintain multiple connections is a challenging aspect of free-space optical cross-connect switches. Embodiments of the present invention dramatically ease the processing requirements and may be used in conjunction with the clever optimization algorithms.

Through use of an embodiment of the present invention, the number of scan positions may be reduced from $n^4$ to $2n^2$. For instance, if the "spot" position error were 0.1 mm and the scan increment were 0.002 mm, then n=50, for which $n^4=6.25\times 10^6$, whereas $2n^2=5000$. In other words, an embodiment of the present invention may reduce the total required scanning positions and total scanning time in this example by as much as a factor of 1250.

This reduction may be accomplished by separating optical beam alignment into two stages. The first stage may include positioning the input beam 206a in the center of the output beam steering element 218n. This first alignment stage may use one set of two-dimensional scans for which the total scan field is $n\times n=n^2$. The second stage may include positioning the output beam (with the output beam steering element 218n) in the center of the output aperture 214n. This second alignment stage may use one set of two-dimensional scans for which the total scan field is $n\times n=n^2$.

In practice, positioning the input beam 207a on the output beam steering element 218n may be less sensitive than positioning the output beam 217n on the output aperture 214n. This means that the input scan field, $n_{input}^2$, may be much smaller than the output scan field, $n_{output}^2$. Without the two stage alignment process, both scan fields may be restricted to the sensitivity of the output aperture 214n. Thus, the required scan field with the invention is $n_{input}^2+n_{output}^2<2n_{output}^2<<n^4$. It should be understood that in alternative embodiments or other configurations of the switching system 200, more than two stages of scanning may be performed.

This scan field reduction (from $n^4$ to $2n^2$) may be accomplished by configuring an optical detector (not shown here, but shown in FIGS. 5A-5H) in the output beam steering element 218n. This optical detector may provide a measured signal to an angle controller 209 for output beam placement optimization on the output beam steering element 218n. The total number of scan positions required for output beam placement optimization is $n^2-n$ for each input beam steering element 208a axis. A fiber power tap detector 222n in the output fiber 212n, which is used in a conventional optical cross-connect set-up, is used for aligning the output beam steering element 218n to the output fiber 212n through a feedback circuit. The output beam steering element 218n is moved through n positions in each of the two degrees of freedom (two axes) so that there are $n^2$ positions for output beam 216n alignment. Thus, the total scan field is $2n^2$.

Continuing to refer to FIG. 2B, proper alignment of the output beam 217n to the output aperture 214n results in the maximum coupling of the input signal power to the output fiber 212n. In practical operations, however, there is an acceptable range of coupling efficiency. Each connection is preferably established and maintained within this acceptable range. Proper alignment of the output beam 217n to the output aperture 214n may be achieved through use of the feedback control system 229.

In the embodiment of FIG. 2B, the feedback control system 229 in further detail includes a fiber power tap 222n placed on the output fiber 212n. The fiber power tap 222n may be a 1% power tap. The fiber power tap 222n connects to signal detection circuitry 224n, which detects an output signal power level on the output fiber 212n of the traffic wavelength(s) $\lambda$t. The signal detection circuitry 224n provides the output signal power level reading to optimization feedback circuitry 226n. Based on the output signal power level reading, the optimization feedback circuitry 226n determines how to adjust the angle of the output beam steering element 218n to cause the output beam 217n to converge into proper alignment with the output aperture 214n. In this embodiment, beam steering element driver circuitry 228n provides an appropriate deflection drive signal to the output beam steering element 218n to cause it to tilt to the desired angle, as determined by the optimization feedback circuitry 226.

The signal detection circuitry 224n may also detect other optical output signal characteristics to determine the alignment of the optical output beam with the output aperture 214n. For example, the signal detection circuitry 224n may be configured to detect a modulation on the optical output signal. Modulation may be applied to wavelengths (i.e., optical signals) for use in confirming by a cross-connect switch that the switch correctly steered the wavelength or multiple wavelengths to the correct fiber(s).

It should be understood that the signal detection circuitry 224n, the optimization feedback circuitry 226n, or the beam steering circuitry 228n may be, in whole or in part, software executing on a processor, field programmable gate array (FPGA), or other electronic device. Moreover, though represented as discrete components, the feedback circuits 224n, 226n, and 228n may be implemented in a single circuit, a combination of circuit and software, or any other mechanism suitable for accomplishing the functions described herein.

In one embodiment, an optical detector 219n is configured in at least one of the beam steering elements. In one embodiment, this element is made from a material, such as InGaAsP, which can absorb light from an optical signal at a traffic wavelength $\lambda$t. In this embodiment, the mirrors in the beam steering element 218a-n may be designed such that some of the light is available for detection (see description of FIGS. 6A-6C below), which provides a cost savings and performance improvement over systems with monitoring detectors external from the beam steering element(s).

In another embodiment, the beam steering element 218a-n may be a material, such as silicon, that is transparent to the optical signals used for telecommunications (i.e., traffic wavelength(s) $\lambda$t). Semiconductors absorb and can therefore be used as detectors for light with wavelengths less than a cutoff wavelength. For example, silicon has a cutoff wavelength of light at 1.1 micrometers, where typical transmission wavelengths used in telecommunications networks are greater than or equal to 1.3 micrometers. To effectively use a beam steering element with a silicon detector, light (i.e., the alignment wavelength $\lambda$a) is added in the couplers 103a, ..., 103n (FIG. 1) or 203a, ..., 203n (FIGS. 2A and 2B) at a wavelength less than the cutoff wavelength of the material used to fabricate the beam steering element. Laser sources are readily available, such as lasers at 0.980 micrometers, and can be used in this manner.

The second embodiment has several advantages. First, none of the light from the telecommunications signals $\lambda$t passing through the device is used for alignment, minimizing losses of optical signal power of traffic wavelength(s). Excessive losses can require the need for further amplification of the telecommunications signals and add extra cost to a network. Second, incorporating the detector 219n into the beam steering element 218n as opposed to a separate element (not shown) results in a cost savings and ensures optical alignment of mirrors (not shown) on the output beam steering elements 208a-n relative to the detectors. Third, the use of silicon for a detector, and the fabrication of such devices, is well known and cost effective. Finally, any added cost caused by adding the extra light generating elements, such as an alignment laser operating at 0.980 micrometers, can be reduced or minimized by sharing a single source among all the input couplers, 103a, ..., 103n (FIG. 1) or 203a, ..., 203n (FIGS. 2A and 2B).

Figure 3:
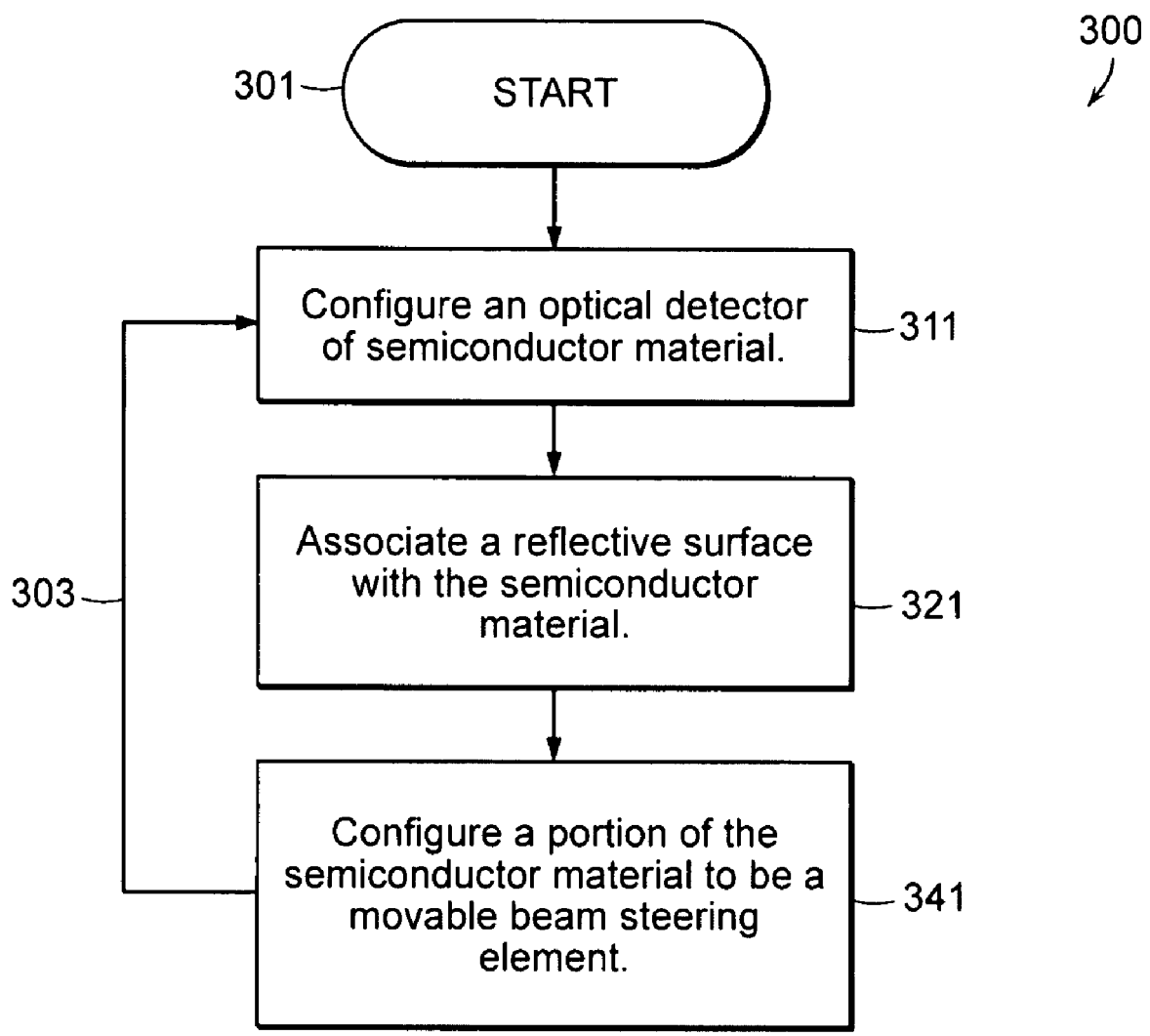
FIG. 3 is a high-level flow chart of a process for manufacturing an embodiment of a beam steering element used in the switching system of FIG. 2.

FIG. 3 is a flow chart of a process for manufacturing or fabricating a beam steering element having an integral detector. The process 300 starts at step 301. In step 311, an optical detector is configured of semiconductor material. The American Heritage® Dictionary of the English Language, Fourth Edition, defines the term configure as follows: "To design, arrange, set up, or shape with a view to specific applications or uses." In step 321, a reflective surface is associated with the semiconductor material. Finally, in step 341, a portion of the semiconductor material is configured to be a movable beam steering element. The process 300 returns 303 to step 311 to manufacture another optical beam steering element.

Figure 4:
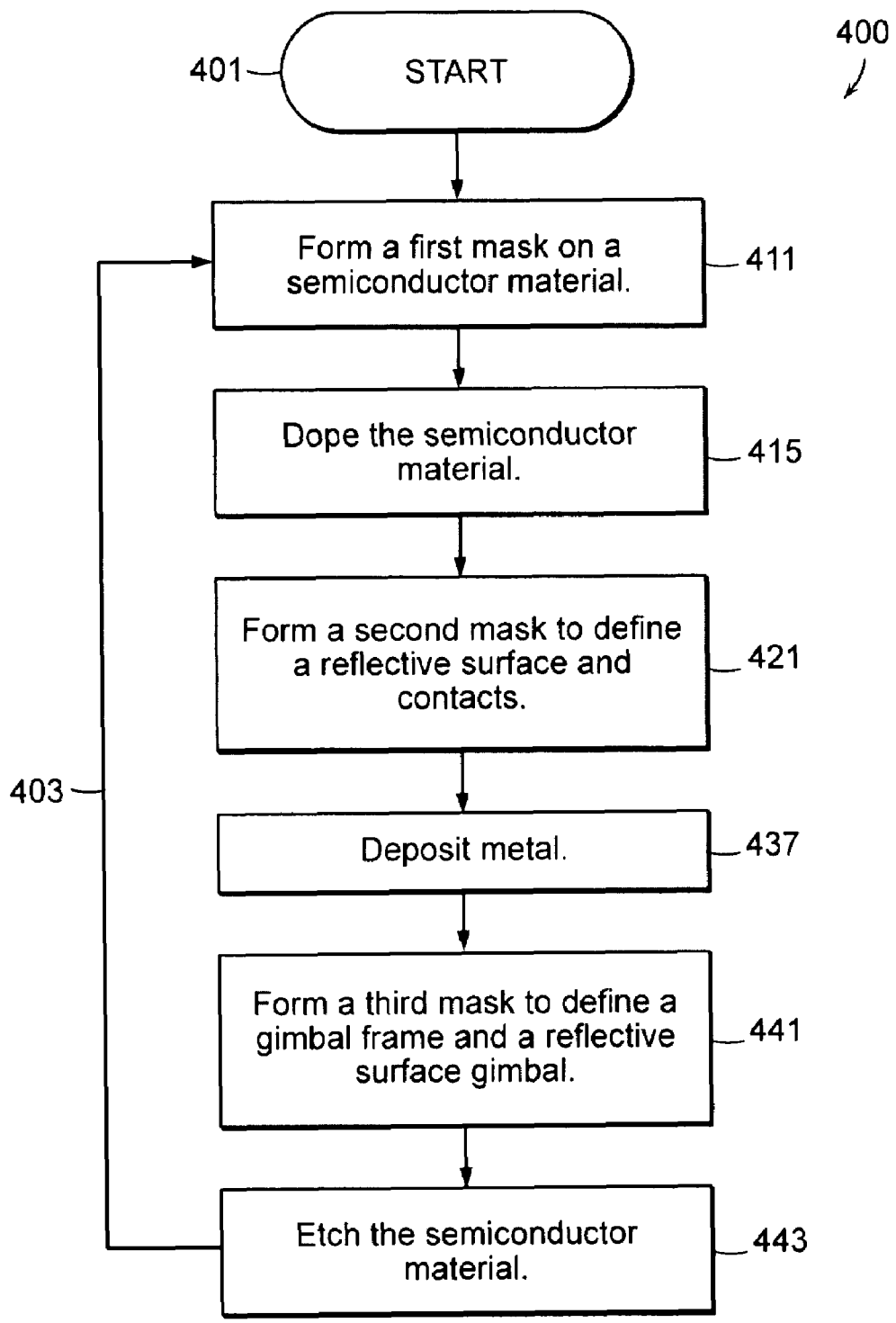
FIG. 4 is a flow chart of a process for manufacturing another embodiment of the beam steering element.

FIG. 4 is a flow chart of a process for manufacturing the same or another embodiment of the beam steering element. The process 400 starts at step 401. In step 411, a first mask defining a p-doped region is formed on a semiconductor material, such as a silicon wafer, having n-doped regions. In step 415, the masked semiconductor material undergoes ion implantation to form the p-doped region. In step 421, a second mask is formed on the semiconductor material to define a reflective surface and electrical contacts. In step 437, the masked semiconductor material undergoes metal deposition to form the reflective surface and the electrical contacts that support connection of the n-doped and p-doped regions to an electrical circuit. In step 441, a third mask is formed on the semiconductor material to define a gimbal frame and a reflective surface gimbal. Finally, in step 443, the masked semiconductor material undergoes an etching process to form the gimbal frame (e.g., X-axis gimbal) and the reflective surface gimbal (e.g., Y-axis gimbal). The process 400 then returns 403 to step 411 to manufacture another optical beam steering element.

FIGS. 5A through 5H referred to below further illustrate the process of manufacturing an embodiment of the beam steering element as set forth by the flow chart of FIG. 4.

Figure 5A:
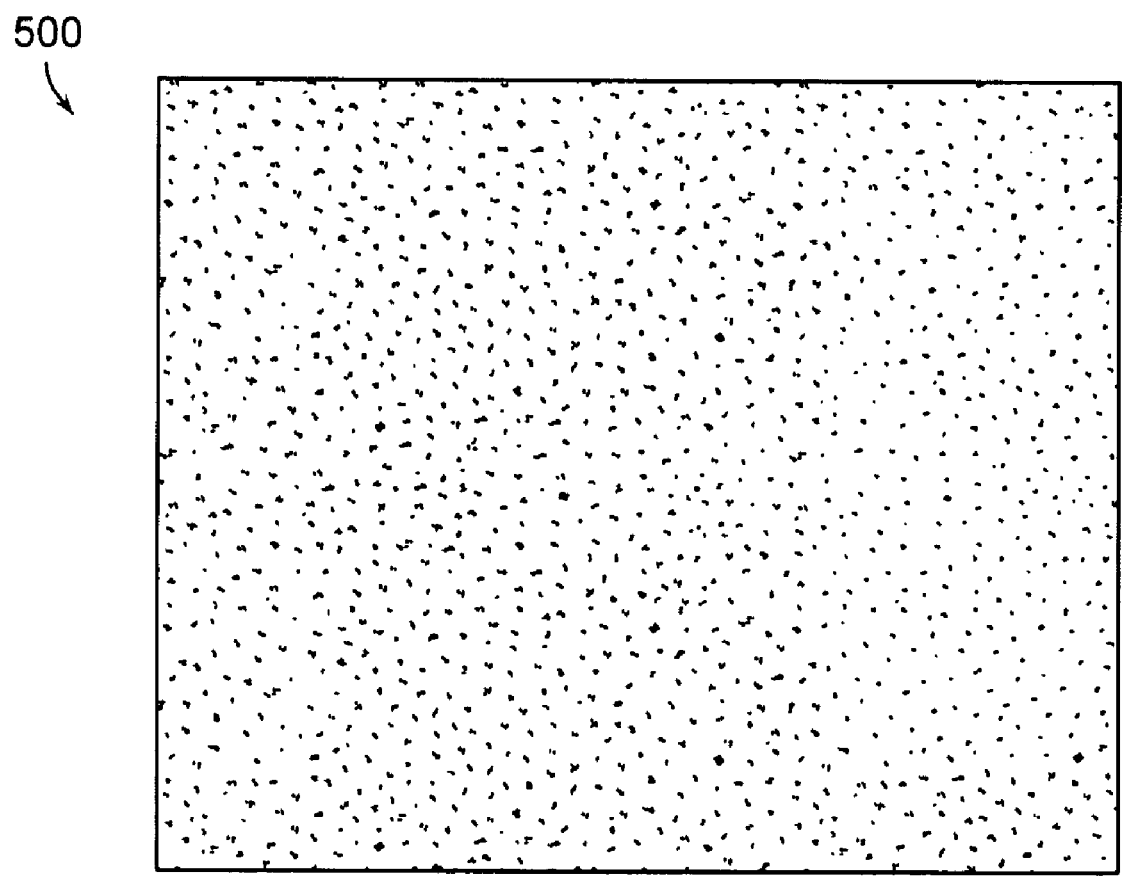
FIG. 5A is a top view of a square area of semiconductor material used to manufacture an embodiment of the beam steering element.

FIG. 5A is a top view of a square area of semiconductor material 500 used to manufacture an embodiment of the beam steering element. The semiconductor material may be a silicon wafer or any other type of semiconductor material (e.g., gallium arsenide (GaAs)) of any shape or size.

Figure 5B:
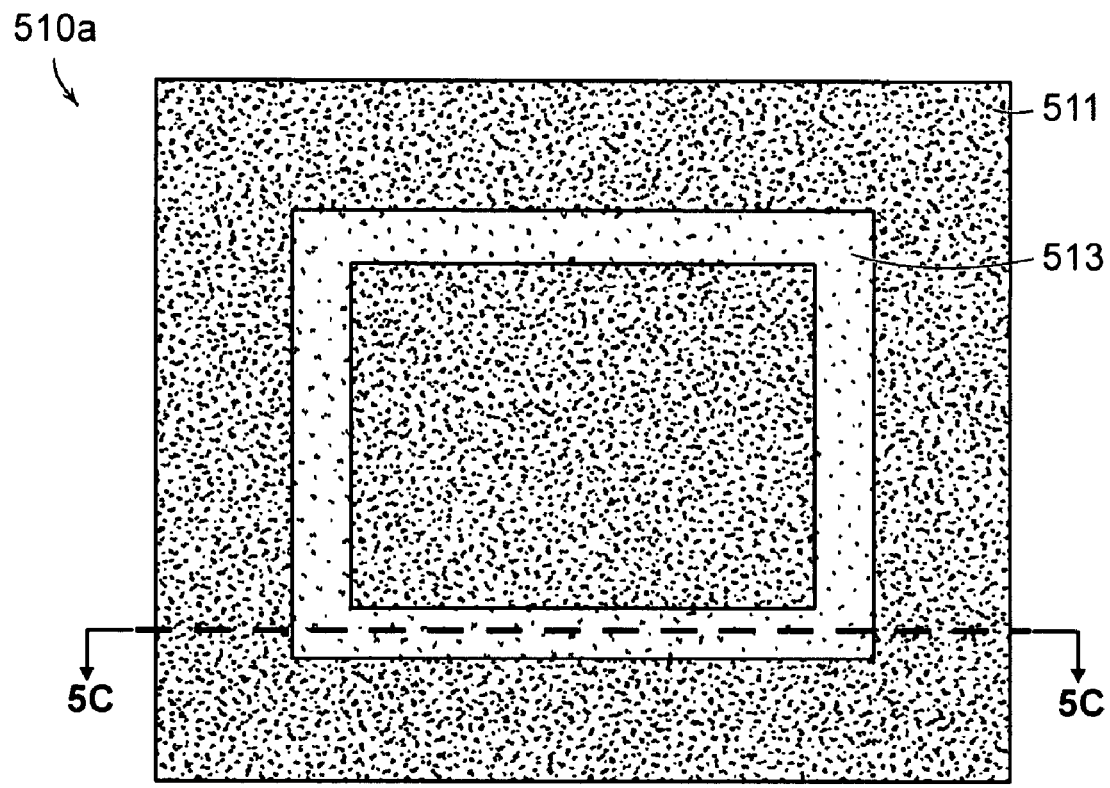
FIG. 5B is a top view of the semiconductor material of FIG. 5A having masking material (e.g., photoresist) on its surface arranged according to a first pattern.

FIG. 5B is a top view of the semiconductor material of FIG. 5A having masking material (e.g., photoresist) 510a on its surface arranged according to a first pattern. The masking material 511 may be applied to the semiconductor material 513 (which is ion implanted beforehand to form an N-doped region) using known photolithography techniques. Specifically, a layer of photoresist may be applied to the surface of the N-doped semiconductor material. The layer of photoresist may then be exposed to light, such as ultraviolet light, to selectively harden the photoresist in specific places to form the desired pattern shown in FIG. 5B. According to known photolithography techniques, either "positive" or "negative" types of photoresist may be used. In this case, negative photoresist is used.

Figure 5C:
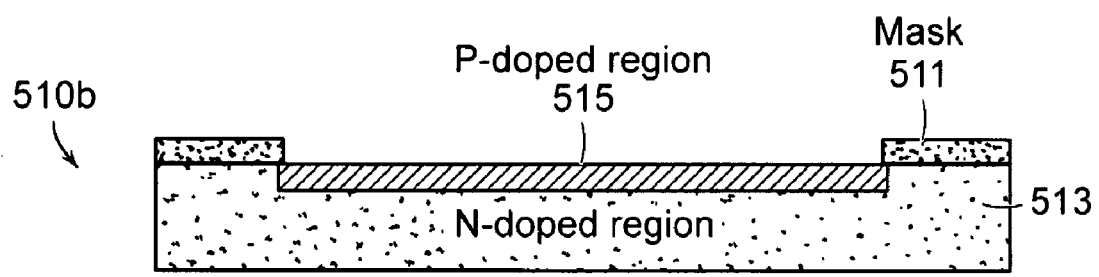
FIG. 5C is a cross-sectional view of the semiconductor material of FIG. 5B after ion implantation forming an optical detector.

FIG. 5C is a cross-sectional view of the masked semiconductor material of FIG. 5B after ion implantation 510b forming an optical detector. As shown, a P-doped region 515 is formed adjacent to the N-doped region 513 in those areas where the hardened masking material (i.e., photoresist) is absent. In another embodiment, the optical detector may be positioned on the semiconductor material by known techniques. Multiple optical detectors separated by gaps may also be configured of the semiconductor material. Multiple optical detectors may be isolated on the semiconductor material so that a set of reference signals are used to accurately position the optical beam for optimum positioning.

Figure 5D:
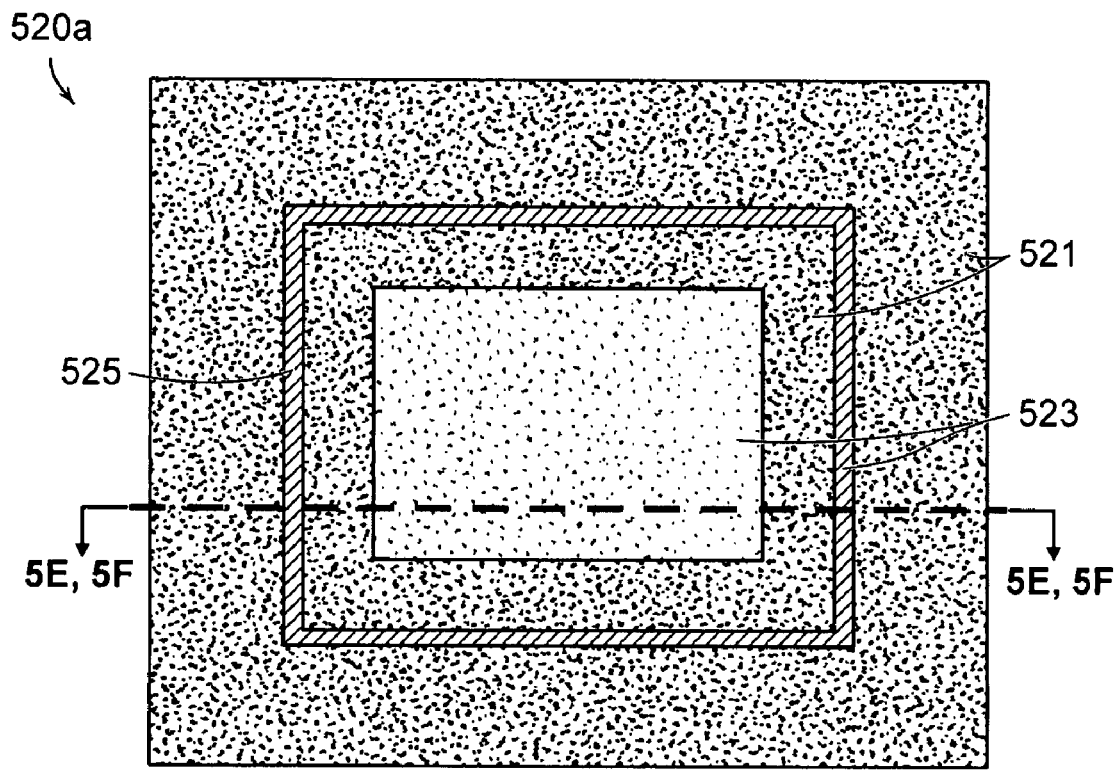
FIG. 5D is a top view of the semiconductor material of FIG. 5C having masking material on its surface arranged according to a second pattern.

FIG. 5D is a top view of the semiconductor material of FIG. 5C having masking material on its surface arranged according to a second pattern 520a. As shown, the unmasked portions of the semiconductor material define a reflective surface 523 and a contact 525.

Figure 5E:
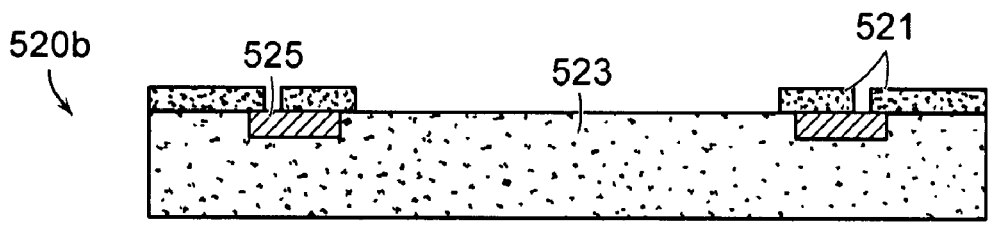
FIG. 5E is a cross-sectional view of the semiconductor material of FIG. 5D.

FIG. 5E is a cross-sectional view of the masked semiconductor material 520b of FIG. 5D. As shown, the masking material 521 exposes a portion of the P-doped region where metal may be deposited to form a contact.

Figure 5F:
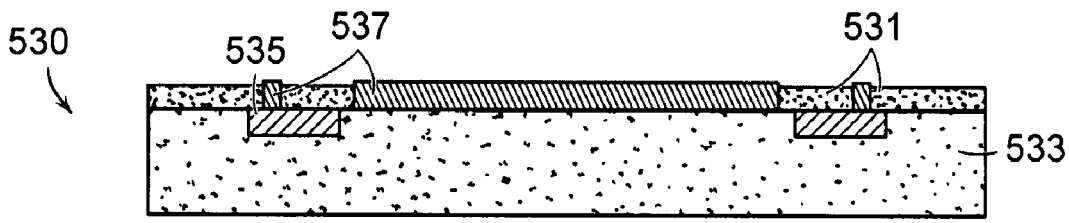
FIG. 5F is a cross-sectional view of the semiconductor material of FIG. 5D after metal deposition.

FIG. 5F is a cross-sectional view of the masked semiconductor material 530 of FIG. 5D after metal deposition. Metal 537 is deposited on the unmasked portions to form contacts to the N-doped region and a reflective surface. The material for the reflective surface may be gold, silver or any other composition having reflective properties.

Figure 5G:
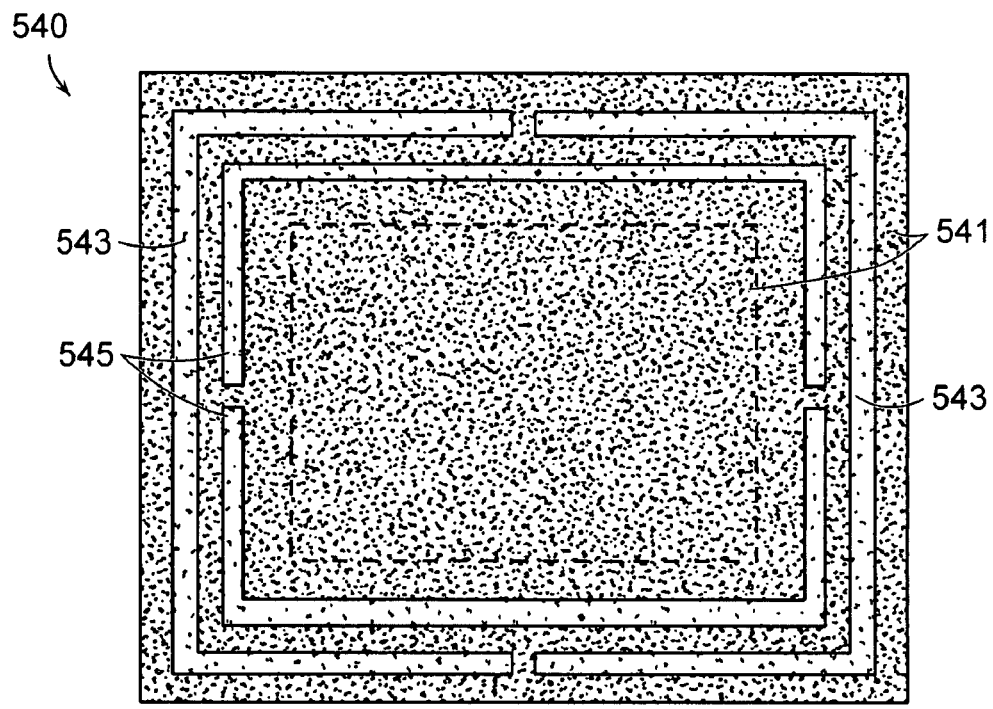
FIG. 5G is a top view of the semiconductor material of FIG. 5F having masking material on its surface arranged according to a third pattern.

FIG. 5G is a top view of the semiconductor material of FIG. 5F having masking material on its surface arranged according to a third pattern 540. The third pattern defines where the semiconductor material is completely removed 543, 545 to form a gimbal frame (by removing the semiconductor material at the unmasked portions of the semiconductor material indicated by reference numeral 543) and a reflective surface gimbal (by removing the semiconductor material at the unmasked portions of the semiconductor material indicated by reference numeral 545).

Figure 5H:
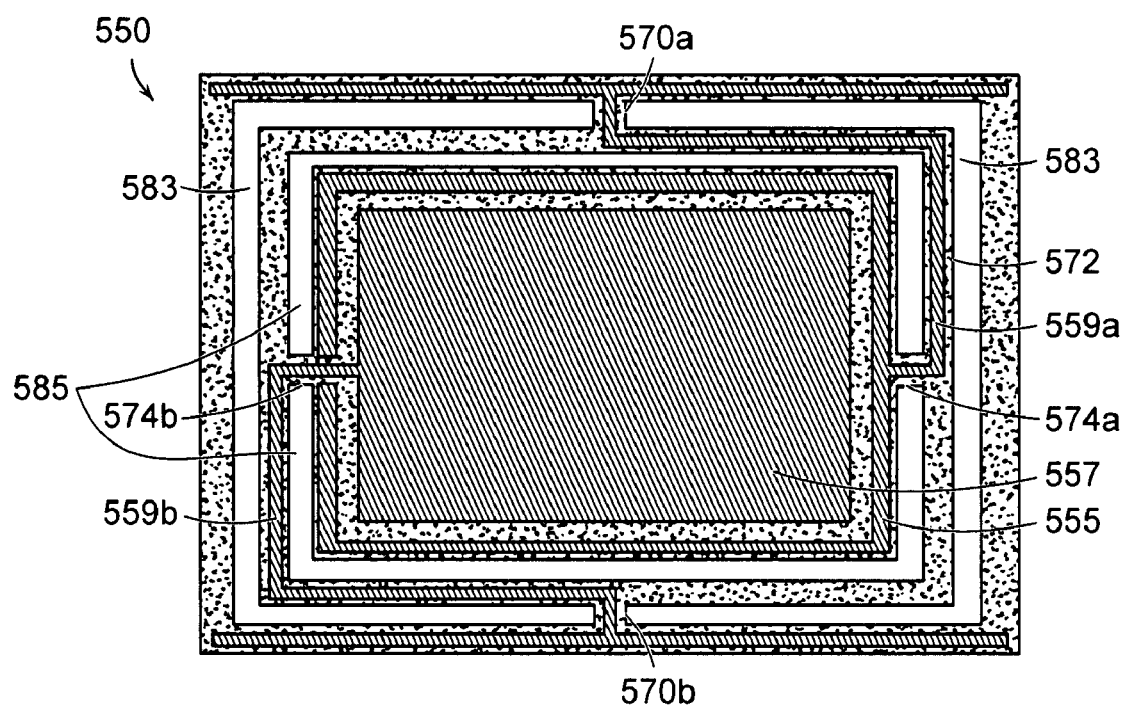
FIG. 5H is a top view of the semiconductor material of FIG. 5G after an etching process.

FIG. 5H is a top view of the semiconductor material 550 of FIG. 5G after an etching process. The areas indicated by reference numeral 583 have had the semiconductor material completely removed to form a gimbal frame 572 movable about torsion hinges 570a and 570b. The torsion hinges 570a, 570b form a vertical axis about which the gimbal frame 572 rotates or twists. The areas indicated by reference numeral 585 have had the semiconductor material removed to form the reflective surface gimbal, which is movable about torsion hinges 574a and 574b. The torsion hinges 574a, 574b form a horizontal axis about which the reflective surface gimbal twists. In this embodiment only a part of the semiconductor material is configured to be a movable beam steering element. However, in other embodiments, the entire beam steering element may be configured to be movable.

The n-electrode 557 and the p-electrode 555 of the p-n diode detector are coupled to outside electronics (not shown) through a p-electrode metallization interconnect 559a and an n-electrode metallization interconnect 559b, respectively. The p-n diode detector may be operated in a conventional back-biased manner for improved sensitivity for optical-to-electrical conversion.

Figure 5I:
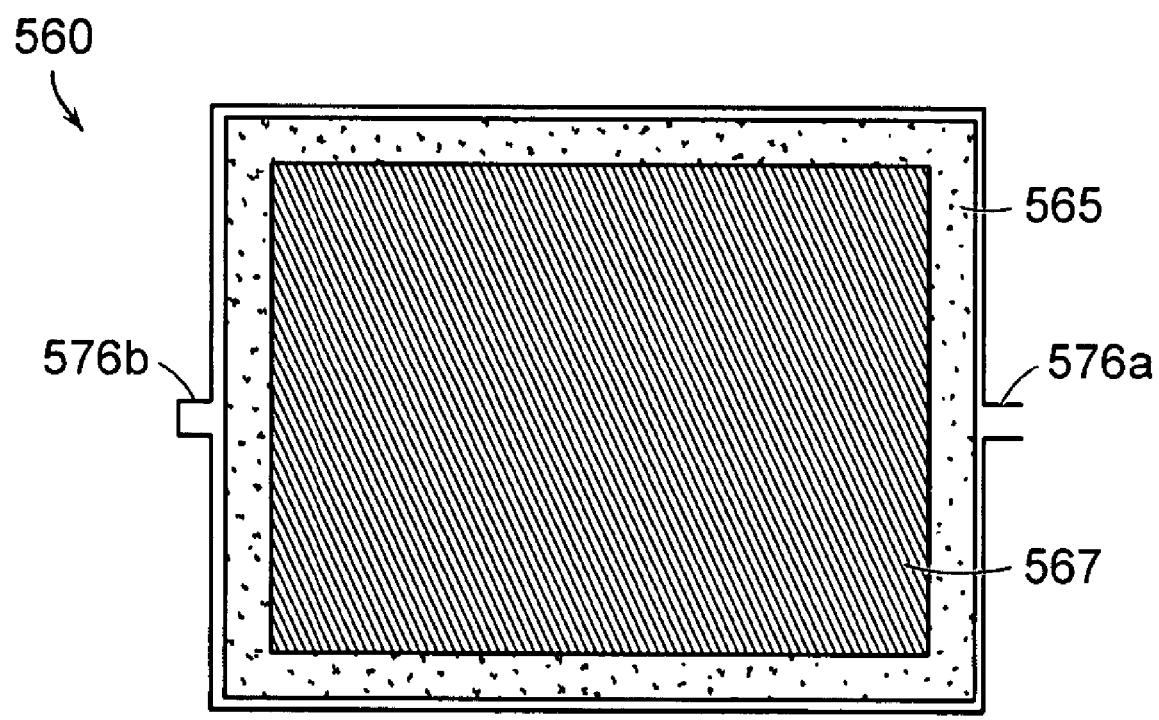
FIG. 5I is a top view of the reflective surface gimbal of the optical beam steering element of FIG. 5H.

FIG. 5I is a top view of the reflective surface gimbal 560 of FIG. 5H. The reflective surface gimbal 560 includes a reflective surface 565 surrounded by the detector region 565. Again, the reflective surface gimbal "twists" about torsion hinges 576a and 576b.

Figure 6A:
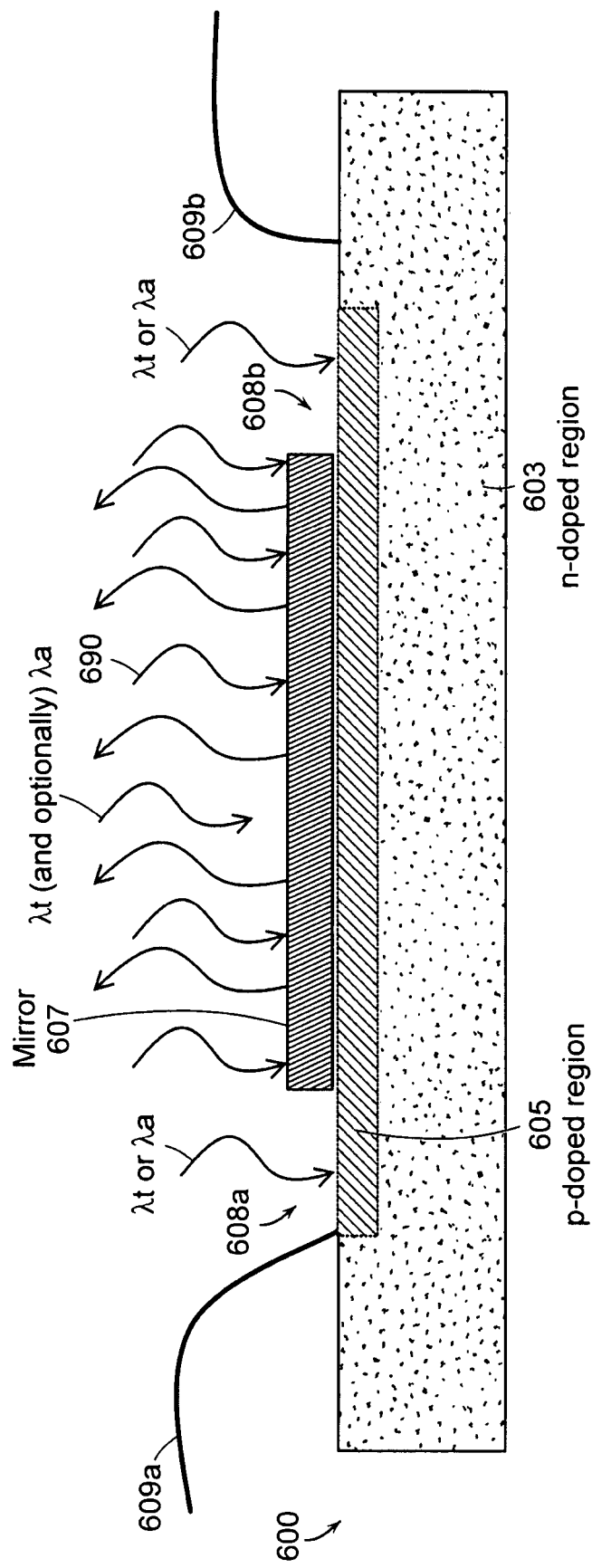
FIG. 6A is a side view of an embodiment of a beam steering element in operation, according to an embodiment of the present invention.

FIG. 6A is a side view of an embodiment of a beam steering element 600 in operation according to the principles of the present invention. The reflective surface 607 is patterned on the beam steering element to cover the center of the detector region defined by the p-doped region 605. Thus, impinging light 690 may be detected at uncovered detector region(s) 608a, 608b and provide a signal through a p-electrode contact 609a and an n-electrode contact 609b. This embodiment applies where the detector 608a,b is made from a material that detects the telecommunications signal and also applies where the detector 608a,b is made of a material that detects an added alignment signal. In each case, the beam spot size may be larger than the mirror size to ensure that the detector 608a,b receives adequate optical power.

Figure 6B:
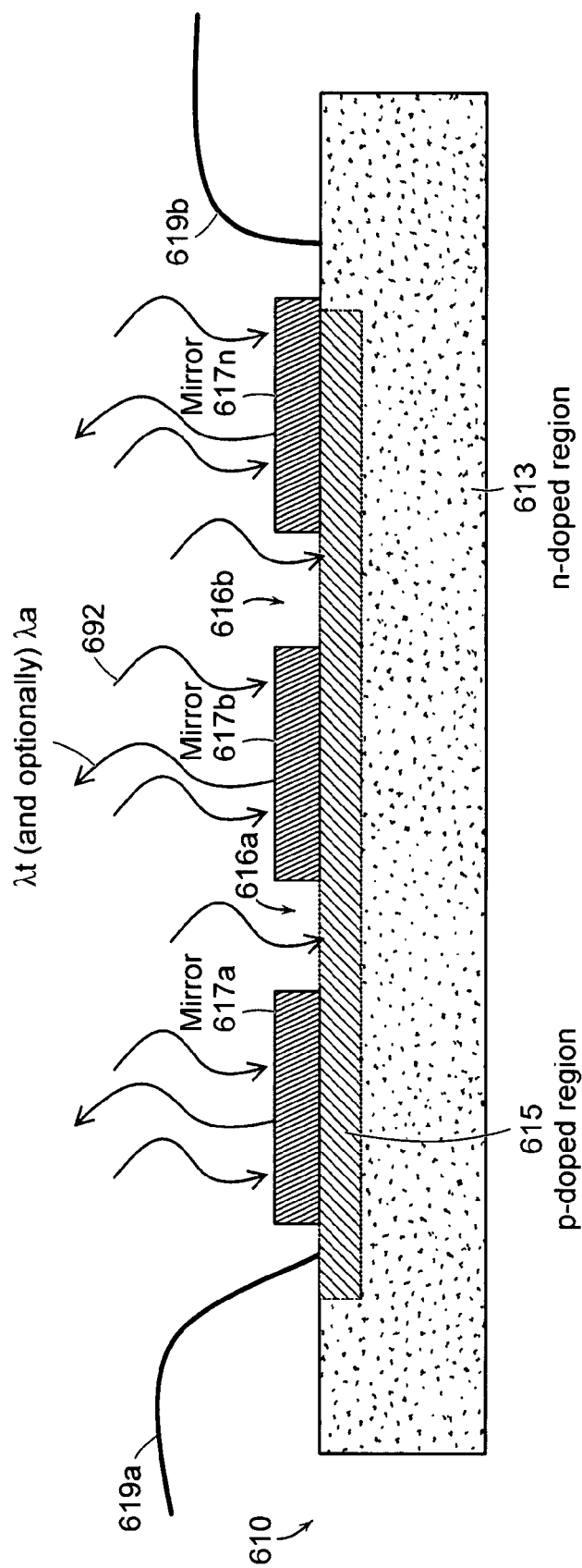
FIG. 6B is a side view of another embodiment of a beam steering element in operation.

FIG. 6B is a side view of another embodiment of a beam steering element in operation 610. Reflective surfaces 617a, 617b, . . . , 617n are patterned on the beam steering element 610 in a manner allowing impinging light 692 to be detected at gaps 616a, 616b between the reflective surfaces 617a, 617b, . . . , 617n. Again, the diode detector of the beam steering element includes a p-doped region 615 with a corresponding p-electrode contact 619a and an n-doped region 613 with a corresponding n-electrode contact 619b. This embodiment applies where the detector 616a,b is made from a material that detects the telecommunication signal and also where the detector 616a,b is made of a material that detects an added alignment signal. In each case, the beam spot size should be large enough to ensure the detector 616a,b receives adequate optical power.

Figure 6C:
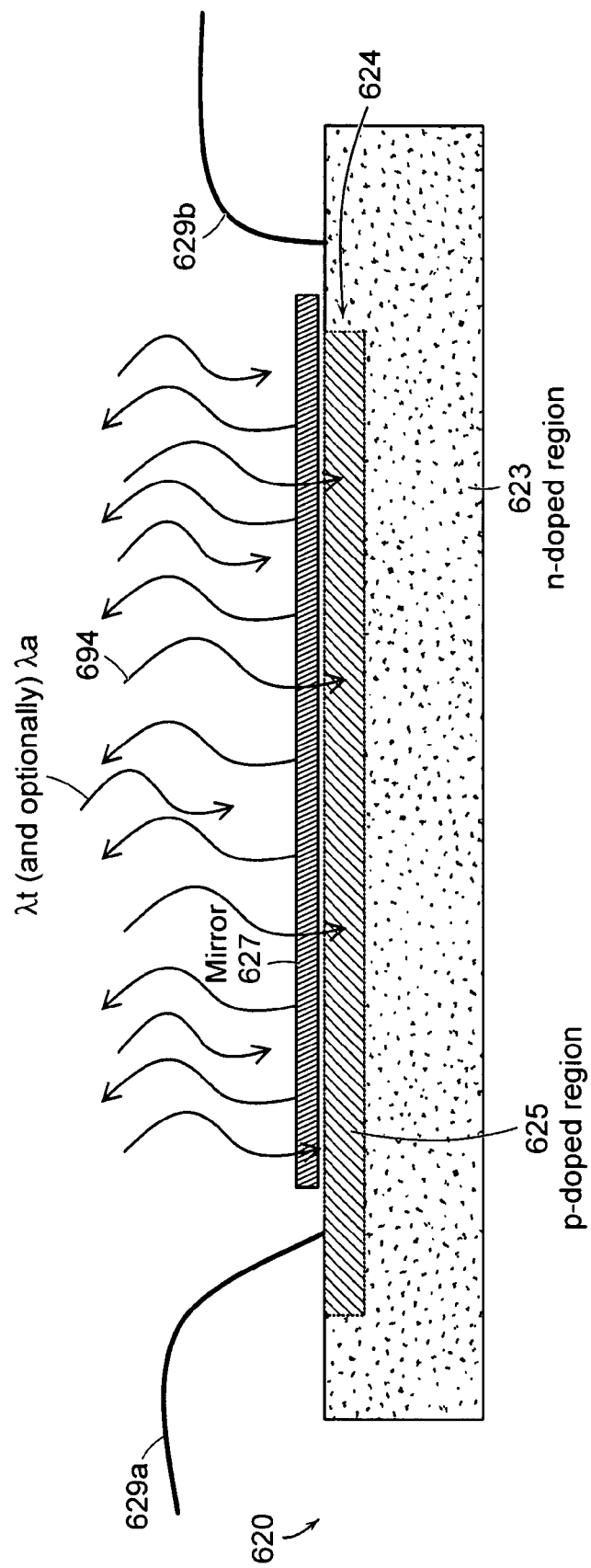
FIG. 6C is a side view of another embodiment of a beam steering element in operation.

FIG. 6C is a side view of another embodiment of a beam steering element in operation 620. In this embodiment, the reflective surface 627 is patterned on the beam steering element 620 to cover the entire detector 624 formed of a p-doped region 625 and a n-doped region 623. In this embodiment, the reflective surface 627, however, is thin enough (i.e., transmits enough optical energy) to allow impinging light 694 to be detected by the detector 624. This embodiment applies where the detector 625, 623 is made from a material that detects the telecommunications signal ($\lambda t$) and also applies where the detector is made of a material that detects an added alignment signal ($\lambda a$). In each case, the intensity of the optical beam must be great enough for the detector to receive adequate optical power through the reflective surface 627.

Figures 2, 7A:
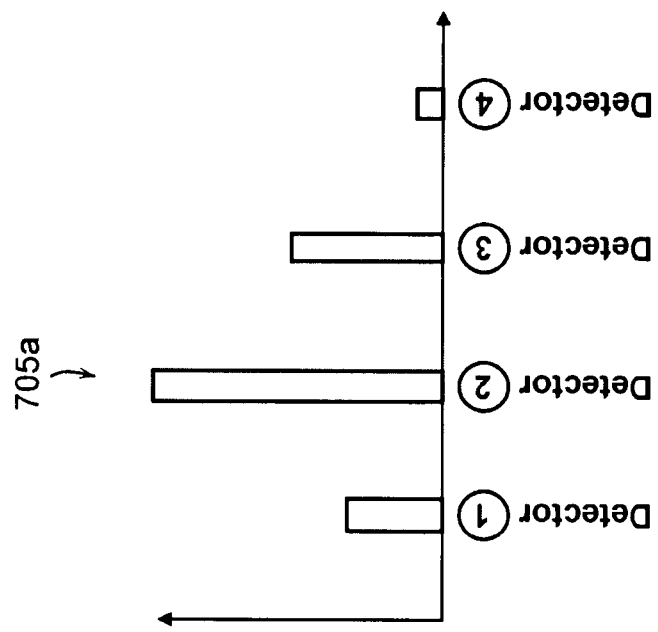
Figures 1, 7A:
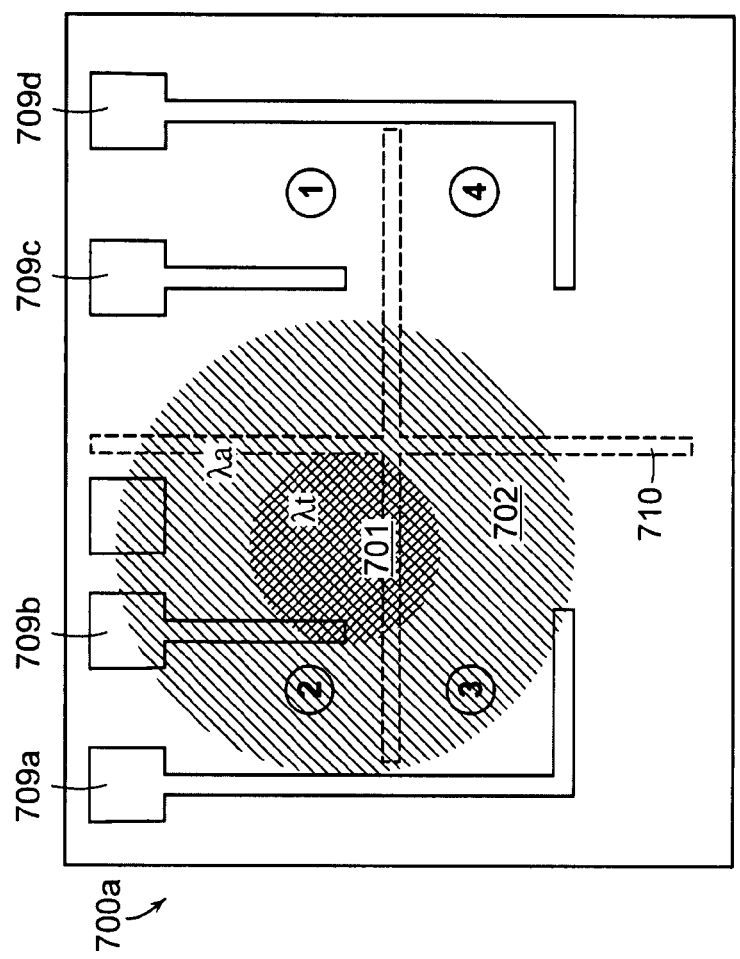

FIG. 7A-1 shows an embodiment of an optical beam steering element 700a having four pads or contacts 709a, 709b, 709c, and 709d, each of which is coupled to a respective optical detector element (not shown). A reflective surface (not shown) may be located in the center of the optical beam steering element 700a. The detector region surrounding the reflective surface may be opto-electrically divided by insulators or gaps 710 into four regions or quadrants (marked generally by numerals 1-4) corresponding to the four detectors elements (not shown).

An optical communications signal beam 701 (i.e., traffic wavelength λt) and optical alignment beam 702 (i.e., alignment wavelength λa) are shown by way of circles superimposed on the beam steering element 700a.

FIG. 7A-2 is a graph 705a of output detector element signals from the four quadrants 1-4 of optical detector elements that can be used to determine a position of the optical signal beam 701 on the optical beam steering element 700a. When the optical signal beam 701 departs from the reflective surface, optionally in unison with an optical alignment beam 702 with a larger diameter than the optical signal beam 701, the output detector signals can be used to determine a position of the beam 701 on the optical beam steering element 700a. In this instance, the different output detector signal levels from each of the detectors, caused by reaction of the detectors to the traffic or alignment wavelength(s) λt, λa, corresponding to the contacts 709a-d (i) indicate that each of the detectors is exposed to unequal portions of an optical alignment beam 702 and (ii) indicate a misaligned, optical, signal beam 701, which is oriented in the center of the optical alignment beam 702. As described above in reference to FIGS. 2A and 2B, the output detector signals may be provided to the angle controller 209 for optimizing output beam placement on the optical beam steering element 700a.

Figures 2, 7B:
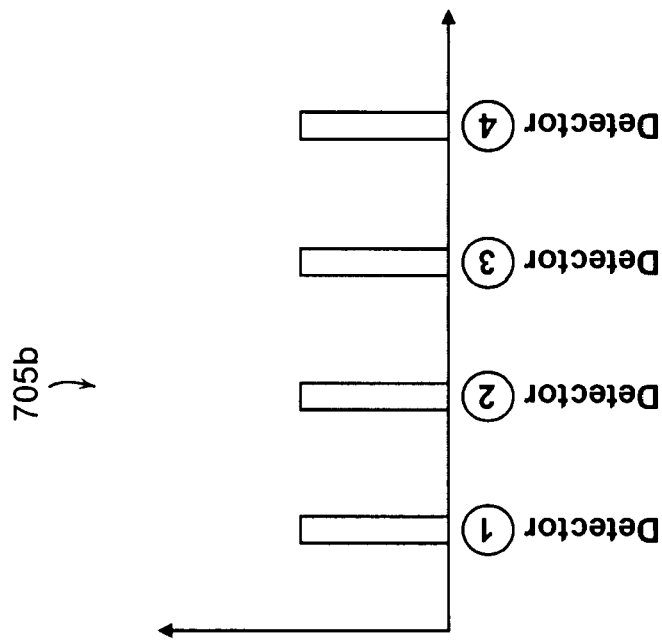
Figures 1, 7B:
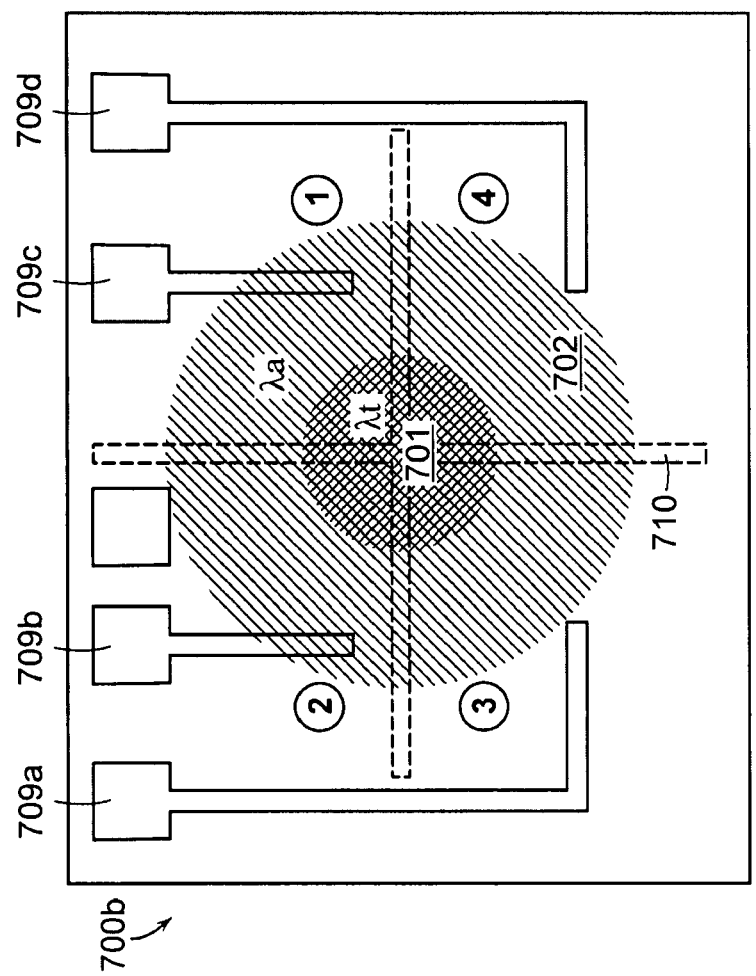

FIG. 7B-1 is a top view of a portion of the optical beam steering element of FIG. 7B. In this instance, equal output detector element signal levels from each of the detector elements (i) shows that each of the detector element regions are exposed to equal portions of an optical alignment beam 702 (or optical communications beam 701 in other embodiments) and (ii) indicates an aligned optical signal beam 701. Thus, the output detector element signals may be used to position the center of the optical signal beam 701 and achieve optimum alignment.

FIG. 7B-2 is a graph 705b indicating the correct alignment by way of equal signals produced by each of the optical detectors corresponding to contacts 709a-d.

It should be appreciated that the present invention can be implemented in numerous ways, including as a process, an apparatus, a system, a device, a method, or a computer readable medium such as a computer readable storage medium or a computer network wherein program instructions are sent over optical or electronic communication lines.

The tilt range for a typical MEMS beam steering element is six to eight degrees, resulting in a beam deflection angle range of twelve to sixteen degrees. Typical voltage range for a MEMS element is 40 volts. The spot alignment range (circular) to a collimated fiber is typically 10 microns to achieve an acceptable power coupling range of −3 dB (3 dB down from maximum coupling). An optical alignment path may be 10 cm to 1 meter. The −3 dB angular alignment range is then 0.01 to 0.1 milliradians. The voltage increment, assuming a linear relationship, is approximately 3 millivolts. There are, thus, 104 or 214 increments in the full tilt range of the MEMS element. There are four such tilt ranges −4×214 or 216 requiring a 16-bit processor to control the voltage to the accuracy required throughout the range.

While this invention has been particularly shown and described with references to preferred embodiments thereof, it will be understood by those skilled in the art that various changes in form and details may be made therein without departing from the scope of the invention encompassed by the appended claims.

It should be understood that embodiments of the optical detector may include a quadrature optical detector or a detector with one, two, three, or more than four optical detector elements.

It should be understood that embodiments of the optical beam steering element and system may also be employed in applications of spectral regions outside of the visible optical spectrum, such as: infrared, x-ray, ultraviolet, and so forth.

It should also be understood that software used to control beam steering elements may be stored in a computer-readable medium, such as a CD-ROM or computer memory, and loaded/executed by a digital processor configured to execute the software in a manner adapted to interface directly or via other electronics causing the beam steering elements to steer a beam and detect optical energy with the optical detector as described herein.

It should also be understood that the optical detector described herein may be any known optical detector, such as a metal-semiconductor-metal (MSM) photodetector or an avalanche photodiode (APD).

What is claimed is:

1. An optical cross-connect switching system, comprising:
a first beam steering element with a reflective surface in optical association with a first optical fiber array;
a second beam steering element with a reflective surface on a substrate in optical association with a second optical fiber array, the second beam steering element optically arranged with the first beam steering element to direct an optical beam from a first optical fiber in the first optical fiber array to a second optical fiber in the second optical fiber array; and
the substrate sensitive to an alignment beam to provide information about an angle of the first beam steering element.

2. The optical cross connect switching system according to claim 1 wherein the substrate is a p-n diode optical detector.

3. The optical cross-connect switching system according to claim 2 wherein the p-n diode optical detector includes multiple regions separated by insulator gaps.

4. The optical cross-connect switching system according to claim 2 wherein the second beam steering element includes a reflective surface covering at least a portion of the p-n diode optical detector.

5. The optical cross-connect switching system according to claim 1 wherein the reflective surface is on the substrate of the second beam steering element in a manner selected from a group consisting of:
the substrate is covered by the reflective surface of the second beam steering element;
the reflective surface of the second beam steering element is covered by the substrate;
the substrate is interspatially covered by the reflective surface of the second beam steering element;
the reflective surface of the second beam steering element is interspatially covered by the substrate;
the substrate is covered by a portion of the reflective surface of the second beam steering element;
the reflective surface of the second beam steering element is covered by a portion of the substrate;
the substrate is adjacent to the reflective surface of the second beam steering element;
the substrate is on top of the reflective surface of the second beam steering element; and the substrate is inset in the reflective surface of the second beam steering element.

6. The optical cross connect switching system according to claim 1 further comprising a controller coupled to the substrate that controls the angle of the first beam steering element.

7. The optical cross-connect switching system according to claim 1 wherein the first and second beam steering elements are microelectro-mechanical system (MEMS) beam steering elements.

8. The optical cross-connect switching system according to claim 1 wherein the first and second beam steering elements comprise two, single-axis, beam steering elements.

9. The optical cross-connect switching system according to claim 1 wherein the first and second beam steering elements comprise a reflective surface formed by a material selected from a group consisting of at least one of the following: metal or dielectric.

10. The optical cross connect switching system according to claim 1 further comprising a second optical detector associated with the second optical fiber, the second optical detector adapted to provide information about an angle of the second beam steering element.

11. The optical cross connect switching system according to claim 10 further comprising a controller coupled to the second optical detector that controls the angle of the second beam steering element.

12. The optical cross connect switching system according to claim 1 wherein the first and second beam steering elements are among respective arrays of first and second beam steering elements configured to direct optical beams from optical fibers in the first optical fiber array to optical fibers in the second optical fiber array.

13. The optical cross connect switching system according to claim 1 wherein the first and second optical fiber arrays are multi-dimensional arrays.

14. The optical cross-connect switching system according to claim 1 wherein the reflective surface of the second beam steering element and the substrate are pivotally mounted to a frame on at least one axis.

15. The optical cross-connect switching system according to claim 14 wherein the reflective surface of the second beam steering element and the substrate are pivotally mounted to the frame on two axes, the first axis orthogonal to the second axis.

16. The optical cross-connect switching system according to claim 14 wherein the power detector is electrically coupled, via the frame, to an angle controller of the first beam steering element.

17. An optical cross-connect switching system comprising:
an optical coupler to couple an alignment optical beam to a first optical path supporting a communications optical beam among first multiple optical paths;
a first beam steering element with a reflective surface in optical association with the first multiple optical paths, including the first optical path;
a second beam steering element with a reflective surface on a substrate in optical association with the first beam steering element and second multiple optical paths, the second beam steering element optically arranged with the first beam steering element to direct an optical beam from the first optical path in the first multiple optical paths to a second optical fiber in the second optical path in the second multiple optical paths; and
the substrate sensitive to the alignment optical beam to provide information about a position of the alignment optical beam on the substrate.

18. The optical cross-connect switching system of claim 17 wherein the optical paths are optical fiber paths.

19. The optical cross-connect switching system of claim 17 wherein the substrate provides information about a position of the alignment optical beam on the substrate by providing information about an angle of the first beam steering element relative to the reflective surface of the second beam steering element.

20. The optical cross-connect switching system according to claim 17 wherein the reflective surface is on the substrate of the second beam steering element in at least one of the following locations: above, below, beside, and inset.

21. The optical cross-connect switching system according to claim 17 wherein the reflective surface of the second beam steering element and the substrate are pivotally mounted to a frame on at least one axis.

22. The optical cross-connect switching system according to claim 17 wherein the reflective surface of the second beam steering element and the substrate are pivotally mounted to a frame on two axes orthogonal to each other.

23. The optical cross-connect switching system according to claim 22 wherein the substrate is electrically coupled, via the frame, to an angle controller of the first beam steering element.

24. The optical cross-connect switching system of claim 17 wherein the substrate is sensitive to wavelengths below a band of wavelengths defining the communications optical beam.

* * * * *